Nov. 23, 1948.  W. W. PETERSON  2,454,565
GOVERNOR (SPEED RESPONSIVE TYPE)
Filed Nov. 13, 1944  2 Sheets-Sheet 1

INVENTOR.
WILLIAM W. PETERSON
BY
ATTORNEYS

Nov. 23, 1948.  W. W. PETERSON  2,454,565
GOVERNOR (SPEED RESPONSIVE TYPE)
Filed Nov. 13, 1944  2 Sheets-Sheet 2

Inventor
WILLIAM W. PETERSON
By Carlsen + Hagler
Attorneys

Patented Nov. 23, 1948

2,454,565

UNITED STATES PATENT OFFICE 2,454,565

GOVERNOR (SPEED RESPONSIVE TYPE)

William W. Peterson, Mankato, Minn.

Application November 13, 1944, Serial No. 563,142

4 Claims. (Cl. 264—19)

This invention relates generally to improvements in speed responsive control devices or governors.

The primary object of my invention is to provide a device of this nature employing a fluid as the operating medium and which is extremely simple in construction, installation and operation, and involves the use of no metal to metal moving parts such as to cause wear, and entails therefore little in the way of bearing difficulties. Another object is to provide a device for this purpose which may be readily installed and connected to the driving and controlled equipment, either in horizontal or vertical planes, which may be readily and precisely balanced to facilitate high speed operation, and which is of a nature such as to permit convenient control and regulation of the operating speed of the controlled equipment.

These and other more detailed and specific objects will be disclosed in the course of the following specification, reference being had to the accompanying drawing, in which—

Figure 1:
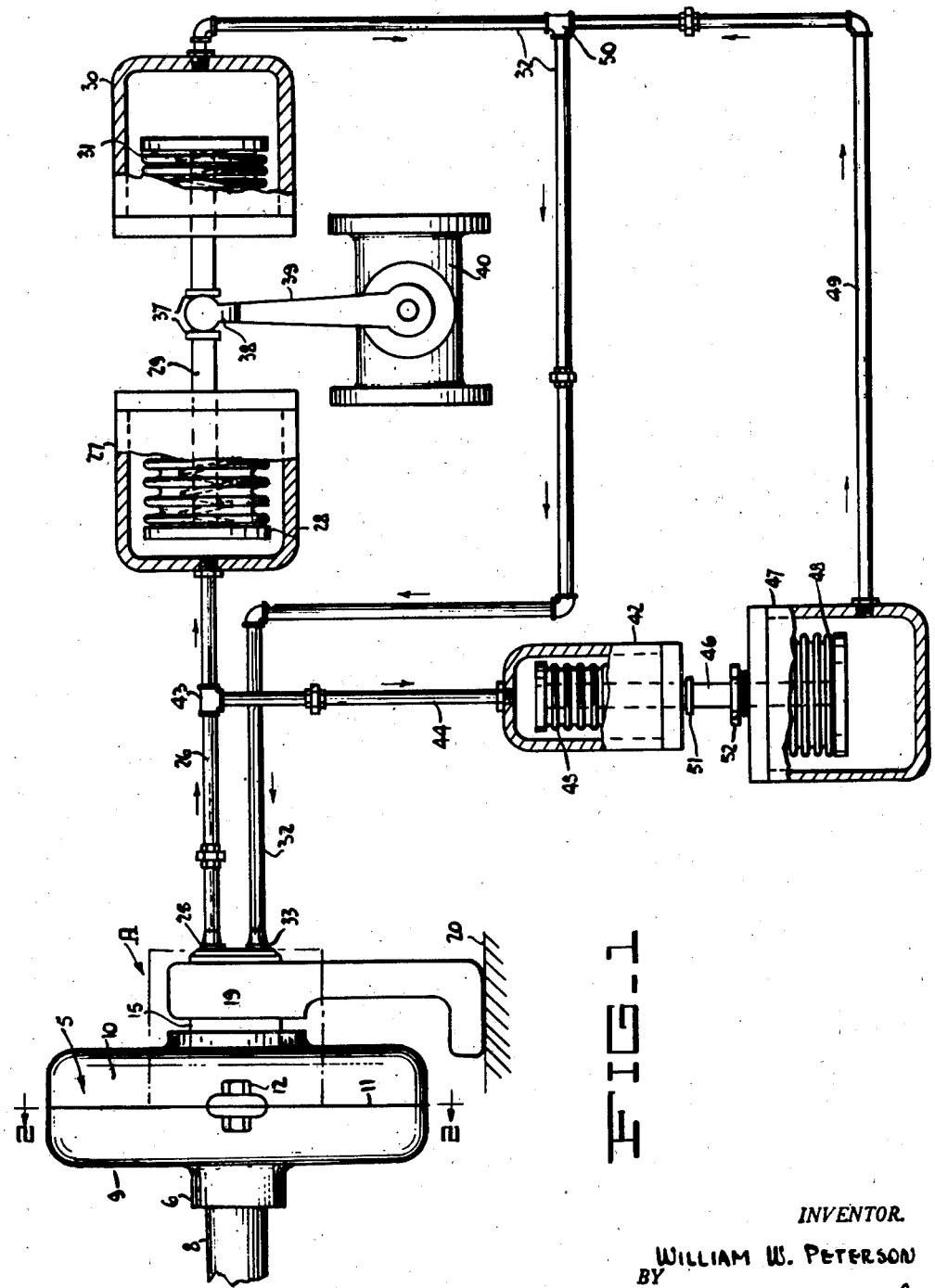
Fig. 1 is a diagrammatical view showing my control device or governor and various external control parts connected thereto.
Figure 3:
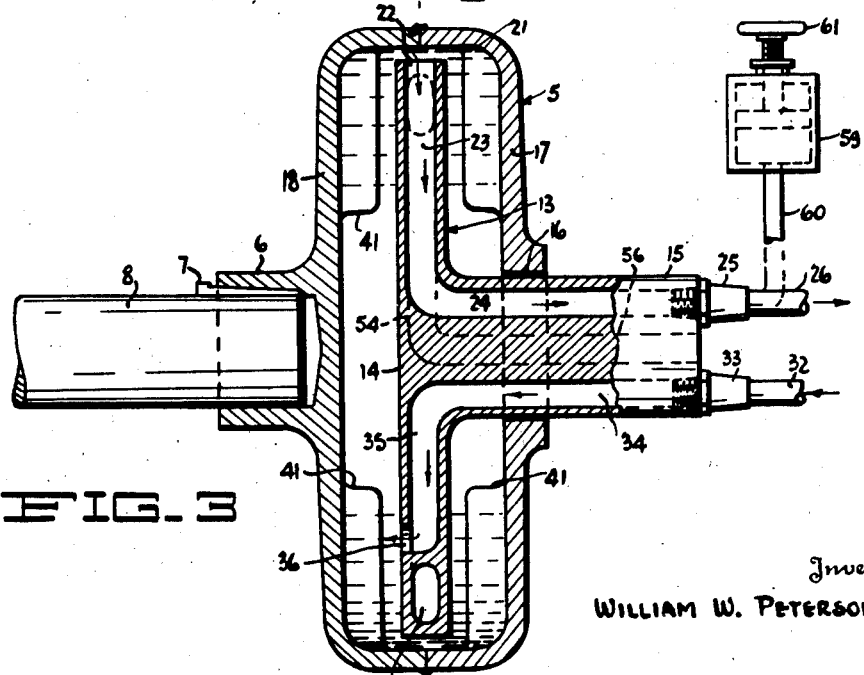
Fig. 3 is a diametrical cross sectional view along the line 3—3 in Fig. 2.

Referring now more particularly and by reference characters to the drawing, A designates generally the control unit or governor of my invention. This unit comprises an outer casing rotor, or rotor element 5 which at one end is provided centrally with a hub 6 which may be secured, as by a key 7, to the shaft 8 of the power plant or equipment (not shown), the speed of which is to be controlled. As shown in Fig. 1 the rotor 5 may be made in two sections 9 and 10 joined along a medial parting line 11 by bolts 12, or any other suitable constructional details may be followed to permit assembly of parts within the rotor, as for example by welding the sections together after assembly, as indicated in Fig. 3. In any event rotor 5 is of flat, drum-like shape and, of course, is rotated along with the shaft 8 to which it is secured.

Arranged within the rotor 5 is a stator element or inner fixed distributor part 13 which includes a flat disk-like portion 14 of a diameter and thickness less than the corresponding interior dimensions of the rotor. This stator, as it will hereinafter be termed for convenience in description is supported coaxially and concentrically within the rotor by means of an integral hub or extension 15 which projects centrally from the disk 14 and outwardly loosely through an opening 16 in the end wall 17 of the rotor, opposite to the end wall 18 carrying the hub 6. Said hub 15, exteriorly of the rotor, is supported in a bearing or bracket 19 (Fig. 1) secured to any conveniently adjacent support or base 20 and it is assumed, at this point that the bracket 19 supports the stator 13 rigidly so that the rotor 5 may rotate freely therearound and with respect thereto.

The interior of the rotor 5 is partially filled with a fluid, such as oil, and as the rotor is rotated, at a speed sufficient for the purpose, the fluid is caused to move into the shape of an annular body crowding outwardly against the inner peripheral rim or wall 21 of the rotor, as represented in Fig. 3. The fluid adjacent wall 21, is thus placed under pressure by action of the centrifugal force upon the body of fluid as a whole, and the pressure thus created will depend upon the speed at which the rotor is rotated, the volume of fluid in the rotor, and the diameter of the rotor. I propose, then to utilize this variable pressure to provide a controlling force or effort. The fluid pressure developed may be caused to be precisely proportional to the speed of rotation of the rotor, and of the driving equipment connected thereto, by maintaining the volume of fluid in the rotor substantially constant. The diameter of the rotor is, of course, unvarying, removing this factor from the problem.

For this purpose, I provide the stator 13 with an opening 22 in its peripheral surface, which opening thus is directly exposed to the entrance thereinto of fluid at high pressure from a point adjacent the rim 21 of the rotor. From the opening 22 a channel or duct 23 leads radially inward through the disk 14 and meets a duct 24 leading outwardly through the rotor hub 15, parallel to the axis thereof. The duct 24 opens through the end of hub 15 and may be conventionally fitted, at 25, to receive a high pressure fluid supply line or pipe 26 leading to the interior of an operating cylinder 27. Fluid under pressure from the control unit is thus supplied the cylinder 27 and operates therein upon a bellows 28 from which extends a piston rod 29. Said rod 29 enters an opposed, fluid replacement cylinder 30 and operates a bellows 31 therein, both bellows 28 and 31 thus operating as a unit under influence of the pressure exerted against the bellows 28 by variable high pressure fluid taken off at the opening 22. A fluid replacement line or pipe 32 from the end of the cylinder 30 leads to a conventional fitting 33 by which connection is made to a duct 34, which parallels the aforesaid duct 24, and which extends inwardly through the hub 15 parallel with its axis, meeting a radially extending duct or channel 35 in the disk 14. Said duct 35 extends in opposite direction to the other radial duct 23 in the stator 13 and finally opens at 36 through one side, or both sides, of the disk 14 at a point spaced well inwardly from the periphery of said disk and from the rim of the rotor 5.

Between the cylinders 27 and 30 the piston rod 29 connecting the bellows 28 and 31 is provided with spaced collars 37 between which is positioned the fork 38 of a lever 39 arranged to swing in a plane parallel to the piston rod. For convenience, it is assumed that lever 39, which is of course oscillated by reciprocation of the piston rod 29, operates to control the speed of the power plant or equipment operating the shaft 8 and the governor rotor 5, and said lever is here shown as connected to a conventional valve 40 which may, for example, control the admission to a steam turbine.

In the operation of the unit as thus far described the rotation of rotor 5 as heretofore stated throws the fluid therein outwardly into an annular body crowding against the inner peripheral wall or rim of the rotor, and the resulting pressure of the fluid immediately adjacent the rim 21, or at the outer part of the body of fluid, crowds fluid under high pressure into the opening 22 whence it finds its way through ducts 23 and 24 and line 26 into the cylinder 27, as indicated by the direction arrows in the drawing. If the pressure of the fluid is great enough, which factor depends upon the speed of the rotor, the bellows 28 in cylinder 27 is collapsed, urging piston rod 29 to the right as viewed in Fig. 1, and oscillating lever 39 to actuate control valve 40. Thus, assuming the control to be set to bring about a certain speed for the unit driving the rotor 5, it will be seen that an increase in speed and resulting increase in pressure of the fluid in the rotor will cause the piston rod 29 to move to the right and actuate lever 39 to position control 40 and reduce the speed.

The volume of fluid in the rotor displaced, upon an increase in speed and resulting flow from the rotor to cylinder 27, is replaced by the expansion of bellows 31 in replacement cylinder 30. For this purpose it is assumed that cylinder 30 is full of fluid and that the expansion of the bellows will drive fluid, of a quantity depending on the movement of the piston rod 29 and thus directly proportional to the quantity of fluid driven from the rotor, through the line 32 and ducts 34 and 35 into the rotor through the opening 36, also as indicated by the direction arrows in the drawing. An exact replacement may thus be secured in order to maintain the volume of fluid in the rotor constant, and remove this variant from the equation upon which the fluid pressure depends. Thus only the speed of the rotor will have an effect on the fluid pressure so that variations in pressure will directly reflect corresponding variations in speed.

Resistance to the inward flow of replacement fluid is avoided by the location of the opening 36 at a point coinciding with the inner part of the annular body of fluid in the rotor as it rotates. The pressure at this point is far less than that existing nearer the rim of the rotor, as will be apparent.

To assist in picking up and setting the body of fluid in motion in the rotor 5 the end walls 17 and 18 thereof may be provided with radially disposed and inwardly turned fins or vanes 41 as shown in Fig. 3.

It is, of course, understood that a reduction in the speed of the rotor will decrease the pressure of the fluid in the cylinder 27, and to compensate for this speed reduction of the unit driving the rotor and restore the speed to the governed value, the lever 39 should move to the left as it is viewed in Fig. 1. This may be accomplished, as will be apparent by the use of conventional spring loaded bellows in the cylinders 27 and 30, which bias the piston rod 29 toward a position whereat valve 40 calls for this desired speed. In this operation the fluid volume within the rotor will be maintained constant by the reverse flow of fluid through line 26 as the pressure in the rotor drops and the bellows 28 expands.

Under some circumstances it may be that more fluid will be required in the rotor than can be put in before the centrifugal force is built up to a point at which the fluid will be thrown and held out against the rotor rim. For this reason I may provide (Fig. 1) an auxiliary high pressure cylinder 42 of small diameter connected at 43 by a line 44 to the high pressure line 26 to receive fluid from the rotor. Within cylinder 42 a bellows 45 is provided which actuates a piston rod 46 extending into an opposed differential replacement cylinder 47 of larger diameter than cylinder 42. A bellows 48 in the cylinder 46 operates to force fluid therefrom into a line 49 which is connected to fluid replacement or inlet line 32 at 50. The arrangement is obviously such that a relatively small volume of high pressure fluid operating in cylinder 42 will cause the larger bellows 48 in cylinder 47 to force out a relatively larger quantity of fluid and urge it into the rotor.

In addition the action of cylinders 42 and 47 may be utilized to vary the control point of the governor, and the speed of the driving unit connected thereto. To this end a stop collar 51 is secured on the piston rod 46 and a screw 52 is threaded in the end of the cylinder 47 for axial adjustment with respect to the rod. By unscrewing the screw 52 the contact of the collar 51 therewith will decrease the amount of fluid which may be forced into the collar, by limiting the expansion of the bellows 48, and vice versa.

The frictional contact between the rotating body of liquid and the stator 13 may at high speeds cause some heating and if required the stator may be cooled. For this purpose the stator disk 14 may be provided with a circular chamber 53 terminating at each side of the duct 23 and communicating at these ends with radial ducts 54 and 55 leading inwardly to parallel ducts 56 and 57 which extend through the stator hub 15 and open at the end thereof and connections, here shown diagrammatically at 100 and 101 but may then be made to the ducts 56 and 57 to circulate a cooling liquid such as water from a pump 102 and reservoir 103 through the chamber 53.

Figure 2:
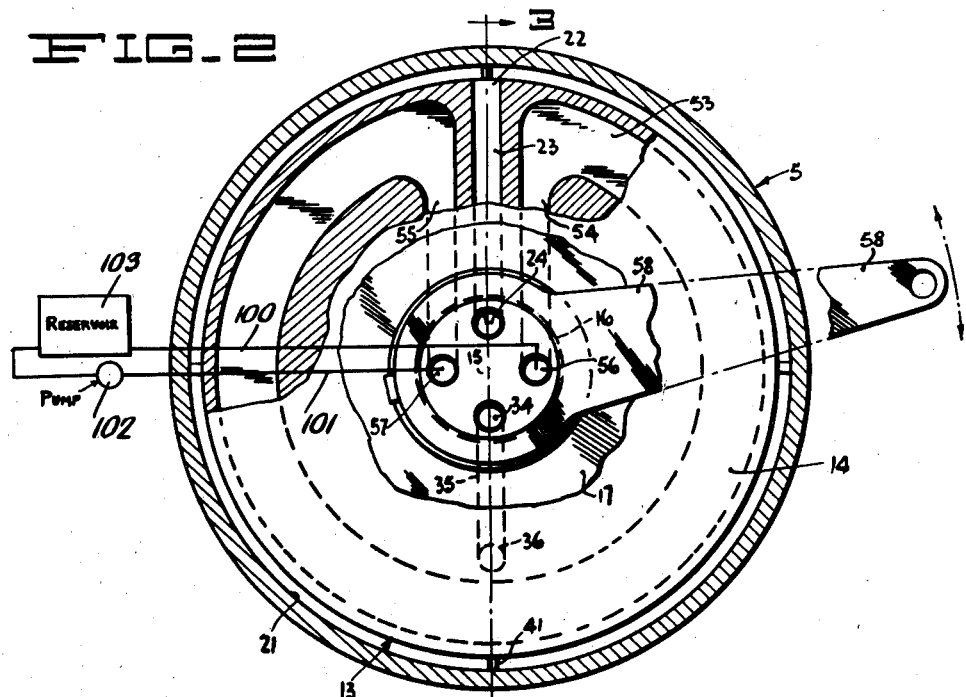
Fig. 2 is an enlarged sectional view through the control unit alone, taken substantially along the line 2—2 in Fig. 1, the bearing or bracket being omitted.

As the rotor 5 and the body of fluid therein rotate a force will obviously be developed which will tend to carry along and rotate stator 13, due to the frictional contact between the fluid and disk 14. This force varies with the speed of rotation, the quantity of fluid in the rotor and the viscosity of the fluid. The latter is of course constant and I propose, as an alternative arrangement to utilize this force as the controlling means. I accordingly may mount the stator 13 for limited rotation in the bearing 19 and secure to the hub 15 of the stator a lever 58 as indicated in Fig. 2, which lever is substituted for, or operates the aforesaid lever 39. Thus, as the speed of rotation of the rotor 5 varies the resulting variation in the drag on the stator B may rotate the same slightly, and the swinging movement of the lever 58 will directly reflect the variation in speed and may operate a control device to correct such variations. The drag of the fluid on the stator may be enhanced by reducing the clearance between the rotor and the peripheral rim of the stator, end play of the parts thus having no effect on this factor.

As stated the volume of fluid in the rotor 5 influences the fluid pressure and fluid drag on the stator or in other words, varies the control point of the governor. Referring to Fig. 3 I show therein a fluid filled cylinder 59 which may be connected by a line 60 to one of the ducts 24 or 34, and which has a control 61 by which fluid may be forced from the cylinder into the rotor 5. By the use of this device, or corresponding means for varying the amount of fluid in the rotor, I may thus vary the speed of rotation of the driving unit connected to the rotor as will be readily apparent.

From the foregoing it will be apparent that I have provided a governor or control device which is very simple, which permits precise control, has a long useful life since there is no metal to metal bearing and which may be readily installed in any position. It may be noted, with reference to the matter of installation, that the driving shaft may readily be extended on through the stator, by merely enlarging the hub thereof, wherever such an arrangement may be advantageous. Other advantages in construction and operation of my device will be readily apparent to those skilled in the art without further description herein.

It is understood that suitable modifications may be made in the structures disclosed, provided that such modifications lie within the spirit and scope of the appended claims. Having now, therefore, fully disclosed my invention, what I claim to be new and desire to secure by Letters Patent is:

1. A speed responsive control device, comprising a means for setting a body of fluid into rotary movement within a confined cylindrical space whereby the action of centrifugal force will result in a variation in pressure in the fluid directly indicative of the speed of rotation, means for tapping off fluid from the body of a variable amount proportional to the pressure, control means operated by the fluid tapped off from the rotating body thereof, and means operated by the pressure of the fluid thus tapped off for replacing fluid in the rotating body of a quantity equal to that tapped off to maintain a constant volume of fluid in the rotating body thereof.

2. A governor for controlling the speed of a rotating element, comprising a generally cylindrical hollow rotor adapted to be rotated by said element, said rotor being partially filled with a fluid which will be compressed and thrown outward in the rotor by centrifugal force and placed under a varying pressure proportional to the rate of rotation of said rotor, a stator element within the rotor and having a fluid outlet means located to receive fluid from a point near the outermost part of the rotating body thereof, a first cylinder connected to receive fluid from said outlet means, said stator element also having a fluid inlet means located to supply fluid to the rotating body thereof at a point adjacent the inner part thereof, a second cylinder connected to supply fluid to said inlet means, and opposed connected piston means on the cylinders adapted as the fluid pressure and volume increases in the first cylinder to drive an equal volume of fluid from the second cylinder into the rotor.

3. A governor for controlling the speed of a rotating element, comprising a generally cylindrical hollow rotor adapted to be rotated by said element, said rotor being partially filled with a fluid which will be compressed and thrown outward in the rotor by centrifugal force and placed under a varying pressure proportional to the rate of rotation of said rotor, a stator element within the rotor and having a fluid outlet means located to receive fluid from a point near the outermost part of the rotating body thereof, a first cylinder connected to receive fluid from said outlet means, said stator element also having a fluid inlet means located to supply fluid to the rotating body thereof at a point adjacent the inner part thereof, a second cylinder connected to supply fluid to said inlet means, and opposed connected piston means on the cylinders adapted as the fluid pressure and volume increases in the first cylinder to drive an equal volume of fluid from the second cylinder into the rotor, and speed control means operated by one of said piston means.

4. A governor for controlling the speed of a rotating element, comprising a generally cylindrical hollow rotor adapted to be rotated by said element, said rotor being partially filled with a fluid which will be compressed and thrown outward in the rotor by centrifugal force and placed under a varying pressure proportional to the rate of rotation of said rotor, a stator element within the rotor and having a fluid outlet means located to receive fluid from a point near the outermost part of the rotating body thereof, a first cylinder connected to receive fluid from said outlet means, said stator element also having a fluid inlet means located to supply fluid to the rotating body thereof at a point adjacent the inner part thereof, a second cylinder larger than the first cylinder and connected to supply fluid to the said inlet means, and oppositely acting piston elements in the cylinders operative as a volume of fluid enters the first cylinder from the rotor to urge a larger volume of fluid from the second cylinder into the rotor.

WILLIAM W. PETERSON.

REFERENCES CITED

The following references are of record in the file of this patent:

UNITED STATES PATENTS

| Number | Name | Date |
|---|---|---|
| 1,008,510 | Wolf | Nov. 14, 1911 |
| 1,762,357 | Schmidt | June 10, 1930 |
| 2,247,989 | Cita | July 1, 1941 |

FOREIGN PATENTS

| Number | Country | Date |
|---|---|---|
| 154,529 | Great Britain | Nov. 3, 1921 |
| 425,310 | Germany | Feb. 20, 1926 |